United States Patent [19]

Rushford

[11] Patent Number: 5,207,262

[45] Date of Patent: May 4, 1993

[54] TONNEAU COVER SYSTEM

[75] Inventor: Steven J. Rushford, Northridge, Calif.

[73] Assignee: Covercraft Industries, Inc., Chatsworth, Calif.

[21] Appl. No.: 791,521

[22] Filed: Nov. 14, 1991

[51] Int. Cl.⁵ .......................................... A47H 23/00
[52] U.S. Cl. ................................. 160/354; 160/368.1; 160/383
[58] Field of Search ...................... 160/354, 327, 368.1, 160/370.2, 369, 383, 391, 395, 399, 402; 296/100

[56] References Cited

U.S. PATENT DOCUMENTS

| | | | |
|---|---|---|---|
| 4,061,394 | 12/1977 | Vodin | 296/100 |
| 4,109,484 | 8/1978 | Cunningham | 160/354 X |
| 4,607,876 | 8/1986 | Reed | 296/100 |
| 4,639,033 | 1/1987 | Wheatley et al. | 160/327 X |
| 4,647,103 | 3/1987 | Walblay | 160/368.1 X |
| 4,730,866 | 3/1988 | Nett | 296/100 |
| 4,739,528 | 4/1988 | Allen | 296/100 X |
| 4,792,179 | 12/1988 | Stevens | 160/327 X |
| 4,941,705 | 7/1990 | Wurtz | 296/100 |
| 4,991,640 | 2/1991 | Verkindt et al. | 160/368.1 |
| 5,058,652 | 10/1991 | Wheatley et al. | 160/327 |

Primary Examiner—David M. Purol
Attorney, Agent, or Firm—Spensley Horn Jubas & Lubitz

[57] ABSTRACT

In a system for covering an opening in a structure, the opening having a periphery, the structure having sidewalls surrounding the opening and extending along the periphery of the opening, and the system including a frame system mountable on the sidewall so as to surround the opening, a flexible sheet for covering the opening, and connector parts for securing the sheet to the frame, the improvement wherein said connector parts comprise a plurality of button members retained by said frame so as to be movable in the direction of the periphery of the opening and to be inseparable from said frame, each button member having a button protruding from said frame; and a plurality of receptacle members each secured to the sheet and having a receptacle in the form of a pocket for securely but detachably retaining said button of a respective button member.

17 Claims, 3 Drawing Sheets

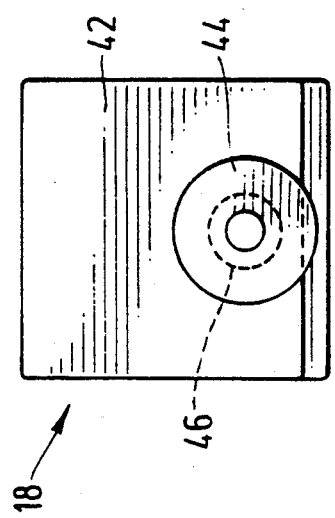
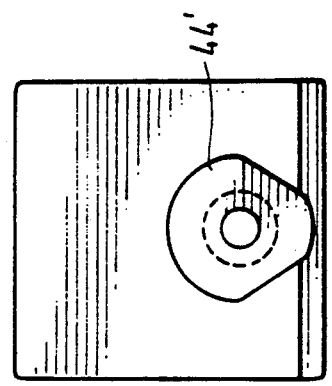
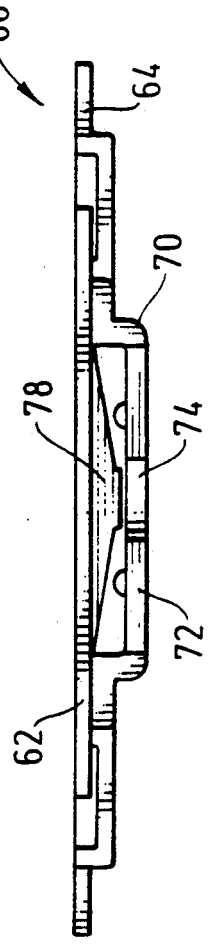
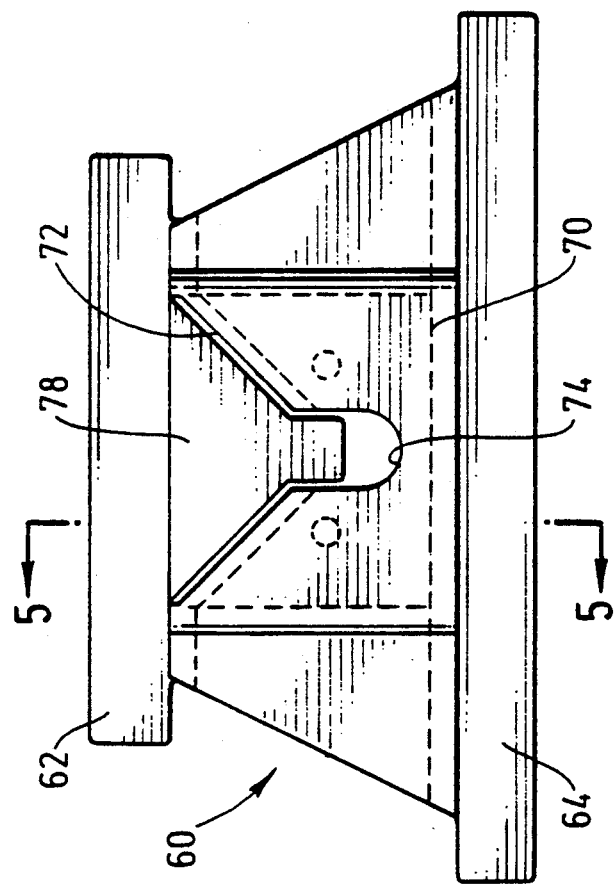

TONNEAU COVER SYSTEM

BACKGROUND OF THE INVENTION

The present invention relates to tonneau covering systems for providing a weatherproof covering over openings in various structures, including open bed trucks, boats, and stationary outdoor structures.

There being an existing need for such covers, a variety of cover systems are presently on the market and are described in the patent literature. While the systems which are now on the market are all asserted to be rugged, durable and easy to assembly and disassemble, it has been found that they all possess certain drawbacks.

In one type of system which is currently on the market, a cover in the form of a flexible sheet is secured to a frame by means of two part snap fasteners. Each snap fastener is composed of two metal parts including a base which is slidably mounted in a frame section and a snap top or button which is secured to the flexible cover. A system of this type is disclosed in U.S. Pat. Nos. 4,730,866 and 4,838,602 and is embodied in products marketed under the trademark LUXXUS. Since the fastener parts are made of metal, they are subject to corrosion and they are difficult to manipulate under freezing conditions or if they should become soiled. In addition, the snap top or button is fastened to only a relatively small area of the flexible cover, creating the danger of tearing of the cover at the fastening location, particularly when the system is exposed to weather extremes or when abnormal stress is applied to the flexible cover sheet.

Other systems on the market utilize snap fasteners having one component which is fixed in place on the frame, and a second component which is secured in place on the flexible cover sheet.

U.S. Pat. No. 4,496,184 discloses a covering system in which the flexible sheet is secured to a frame by means of continuous connectors which can include VELCRO (tm) materials, adhesive tapes, oppositely polarized magnets, or a combination of magnets and steel plates. VELCRO (tm), or hook-and-loop fasteners, are known to have a limited useful life, after which the hook portions will have degraded the loop portions to a service level that is no longer acceptable. Adhesive tapes have an even more limited useful life, while commercially acceptable magnet systems cannot produce high holding force levels.

U.S. Pat. No. 4,639,033 discloses a system in which a flexible sheet is attached to a frame by means of extruded plastic fasteners. Such fasteners are difficult to work with under hot or cold weather conditions which cause the flexible sheet material to expand or contract. Particularly if the flexible sheet experiences a certain degree of expansion, the extruded fastener will no longer have a positive attachment to the frame.

Applicant is also aware of a prior proposal to connect a flexible cover to a frame by a snap fastener arrangement having a fastener base which is clipped to the frame in a manner such that the base can be easily removed. Attachment of the base to the frame requires a spring metal member which is subject to corrosion. Moreover, since the base part can be easily removed from the frame, there is a high likelihood of such base parts being lost, particularly when the flexible cover is not in place.

SUMMARY OF THE INVENTION

It is an object of the present invention to provide an improved cover system which obviates or minimizes the drawbacks discussed above.

A more specific object of the invention is to provide a system having connectors whose parts are securely attached to the flexible sheet and frame, respectively.

A further object of the invention is to provide connector parts which can be made of plastic, thereby eliminating corrosion problems.

A further object of the invention is to provide a system having connector parts which can be easily connected or disconnected and which will remain connected together with a high degree of reliability.

Still another object of the invention is to provide a system in which the connector parts secured to the flexible sheet are secured in a manner which enables the sheet to sustain high force loads without the risk of tearing.

The above and other objects are achieved, according to the present invention by a system for covering an opening in a structure, the opening having a periphery, the structure having sidewalls surrounding the opening and extending along the periphery of the opening, and the system including means defining a frame mountable on the sidewall so as to surround the opening, a flexible sheet for covering the opening, and connecting means for securing the sheet to the frame, the improvement wherein said connecting means comprise a plurality of button members retained by said frame so as to be movable in the direction of the periphery of the opening and to be inseparable from said frame, each button member having a button protruding from said frame; and a plurality of receptacle members each secured to the sheet and having a receptacle in the form of a pocket for securely but detachably retaining said button of a respective button member.

BRIEF DESCRIPTION OF THE DRAWING

FIG. 3 is a front elevational view of a component of a connecting arrangement according to the invention.

FIG. 4 is a top plan view of the component of FIG. 3.

FIG. 5 is a cross-sectional view taken along the line 5—5 of FIG. 3.

FIG. 6 is front elevational view of one form of construction of the component illustrated in FIGS. 3-5.

FIG. 7 is a view similar to that of FIG. 6 of a modified version of the component shown in FIG. 6.

DESCRIPTION OF THE PREFERRED EMBODIMENTS

Figure 1:
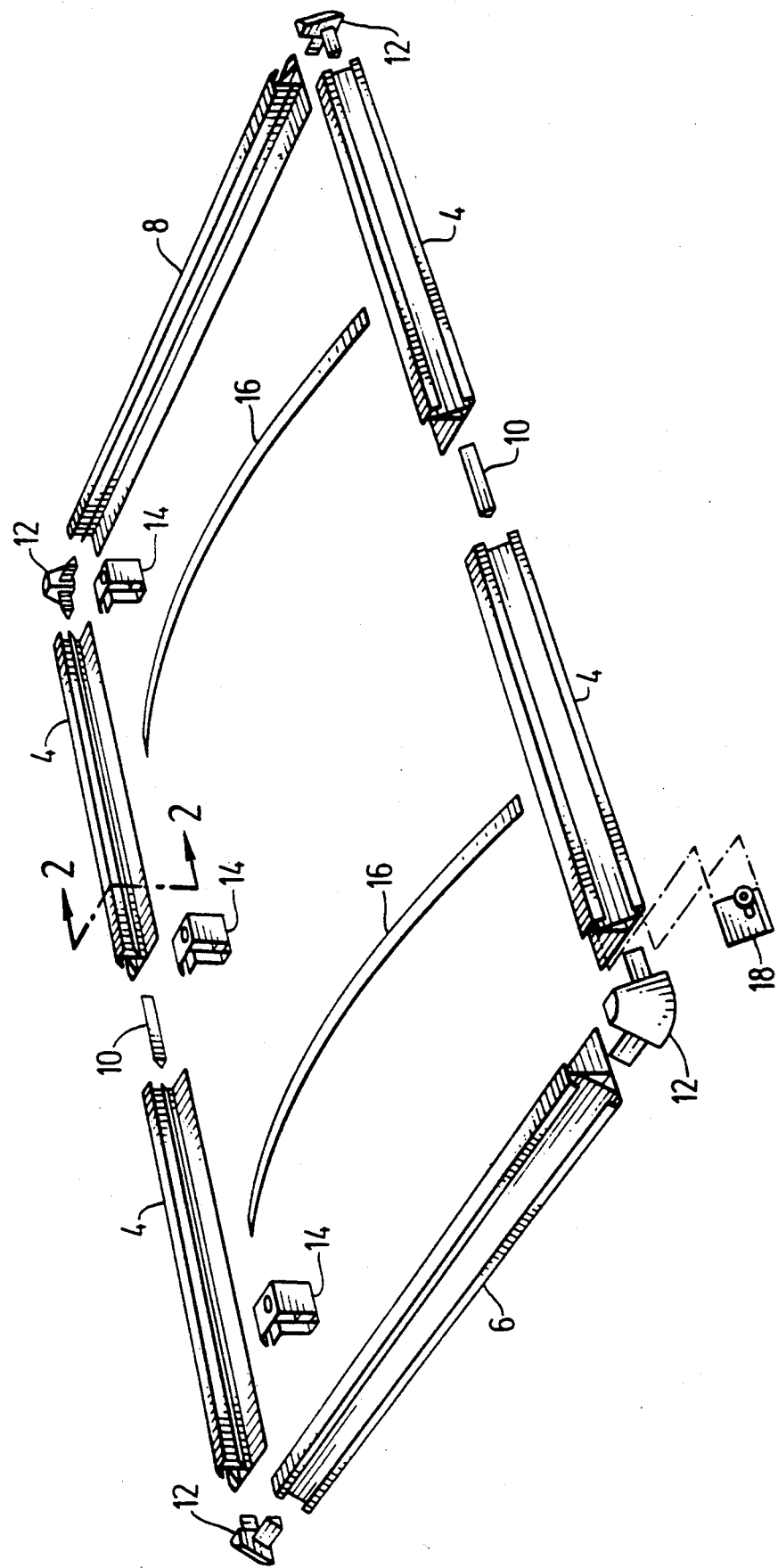
FIG. 1 is a perspective view illustrating basic components of a system according to the invention in a disassembled state.

FIG. 1 illustrates the basic components of a rail system which will be employed, in accordance with the present invention, in combination with a flexible sheet of material to form a tonneau cover for an opening. The principal use contemplated for a system according to the present invention is as a cover for an open truck bed. However, one can imagine other advantageous uses for covering of stationary structures, open boat areas, etc., and it is expected that those purchasing such a system may utilize it in a wide variety of imaginative ways.

The contemplated system includes, firstly, a frame which may have the form shown in FIG. 1 and is composed of a plurality of side rails for, a front rail 6 and a rear rail 8. Each side of the frame system may be defined by one or more side rails 4 and when more than one side rail 4 is disposed along each side of the frame, they may be joined together by suitable rail couplers 10 which will engage rails 4 in a manner to be described below.

Similarly, although it is the usual practice for each of the front and rear rails to be made in one piece, each of these rails could also be made in more than one piece, with the pieces being connected together by a suitable coupler 10. In addition, one or both of front rail 6 and rear rail 8 could be replaced by a simple stiffening element to which the flexible sheet would not be attached. For example, in the case of a system for covering a truck bed, it may not be practical to secure the flexible cover to the front rail.

In each corner of the frame, front rail 6 and rear rail 8 will be connected to adjacent side rails 4 by suitable corner couplers 12 which will be assembled to rails 4, 6 and 8 in a manner that will be described below.

A cover system according to the invention is intended to cover an opening in a structure and the above-described frame is preferably secured to the sidewalls of such opening by suitable clamps 14 which may have any known configuration. The illustrated configuration of clamps 14 enables them to clamp rails 4, 6 and 8 to a horizontal surface of a structure which is open toward the interior of the opening to be covered, as will be described in further detail below. If rails 4, 6 and 8 are to be secured to other sidewall arrangements, such as vertical panels, other known clamp elements can be employed. In any event, rails 4, 6 and 8 could always be fastened to sidewalls of the structure to be covered by bolting or by means of sheet metal screws or other suitable fasteners.

The structure illustrated in FIG. 1 may be completed by arcuate stays, known in the industry as support bows or tonneau bows, 16 which will give a roof-like form to a flexible sheet provided to cover the opening. Stays 16 are installed in such a manner as to be readily removable when they are not desired.

The system further includes a plurality of sliding fasteners 18 which will be retained in channels formed in those rails to which the flexible sheet is to be attached. The manner in which sliding fasteners are held in their associated rails will be discussed in greater detail below. Each fastener 18 will be secured to a receptacle fastened to the flexible sheet.

Figure 2:
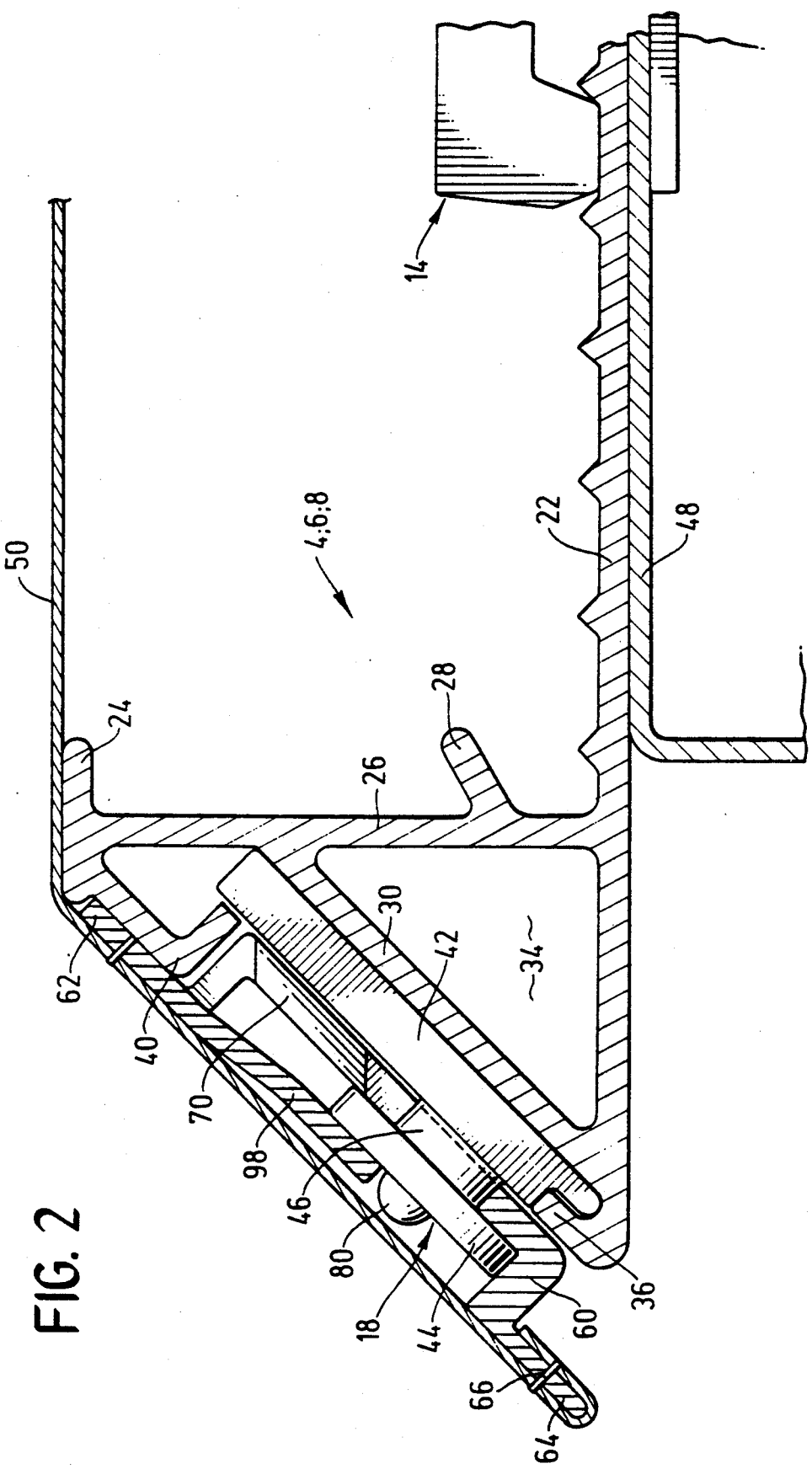
FIG. 2 is a cross-sectional view along the line 2—2 of FIG. 1, and including a fabric covering sheet.

One suitable embodiment of each rail 4, 6, 8 is shown in cross section in FIG. 2. The illustrated embodiment includes a horizontal base piece 22, a top flange 24 and a vertical web 26 extending between base piece 22 and top flange 24. Web 26 carries an inclined projection 28. One end of a stay 16 is to be held in place between projection 28 and base piece 22. Normally, the base piece 22 of front and rear rails 6 and 8 can be made substantially narrower than is illustrated in FIG. 2, or may be eliminated entirely. In addition, rails 6 and 8 neeed not be provided with a projection 28.

Each rail 4, 6, 8 further includes an inclined web 30 which cooperates with portions of web 26 and base piece 22 to form a triangular passage 34. Each end of passage 34 can receive one end of a coupler 10 or 12.

One end of base part 22 is folded up to form a retaining lip 36 and top flange 24 carries a projecting member 40 having a free end which faces toward web 30. Web 30, lip 36 and projecting member 40 cooperate to form the channel for slidably retaining one or more fasteners 18.

As illustrated in FIG. 2, fastener 18 includes a base part 42 which rests on web 30 and is retained in place by lip 36 and projecting member 40. Fastener 18 further includes a button composed of an enlarged head part 44 and a post 46 supporting head part 44 on base part 42. In preferred embodiments of the invention, both head part 44 and post 46 have a circular form, while base part 42 has a square or rectangular shape. Each fastener 18 is preferably made of a plastic material, such as a black acetal plastic.

As will be appreciated from the consideration of FIGS. 1 and 2, fasteners 18 cannot be removed from rails 4, 6, 8 when the rails are assembled together to form a frame, as indicated in FIG. 1. Thus, loss of fasteners 18 from an assembled rail system is not possible. On the other hand, when the frame is disassembled, fasteners 18 can be easily removed from each rail, thereby facilitating replacement of a broken fastener or the addition or removal of fasteners in order to provide the number of fasteners required for a particular flexible sheet.

When the system according to the present invention is to be assembled on a structure having a horizontal wall 48 of a structure presenting an opening to be covered, base pieces 22 of at least rails 4 will be clamped to wall 48 by means of clamps 14. The opening will then be covered by a flexible sheet 50 of plastic, canvas, or other durable material constituting a tonneau cover, or tarp, cover 15 being secured to fasteners 18 in a manner to be described below.

The periphery of sheet 50 carries a plurality of receptacles 60 each permanently secured to sheet 50, as by stitching, stapling, pinning, etc. One such receptacle 60 is shown in FIG. 2 and in greater detail in FIGS. 3 and 4. Each receptacle 60 is preferably made of a plastic material, such as a black acetal plastic, a material which is not subject to corrosion or other forms of deterioration and which can be penetrated in order to be secured to sheet 50 in one of the ways mentioned above.

Turning to FIGS. 3, 4 and 5, it may be seen that one embodiment of a receptacle according to the invention includes flat, elongated upper and lower connecting strips 62 and 64 via which receptacle 60 can be attached to sheet 50 as by staples 66. Strips 62 and 64 permit the transmission of stresses between sheet 50 and each receptacle 60 to be distributed over a relatively large area of sheet 50.

Receptacle 60 further has a body part which defines a pocket 70 for receiving head part 44 of a fastener 18. Pocket 70 has an opening defined by two inclined walls 72 and a recessed part 74 having a U shape and dimensioned for receiving post 46, as illustrated in FIG. 3.

Returning to FIGS. 3-5, receptacle 60 further includes a resiliently deformable retaining flap 78 which is shown in its normal, or undeformed, state in FIGS. 3, 4 and 5 and its deformed state in FIG. 2. Flap 78 is deformed when head part 44 is inserted into pocket 70. At this time, flap 78 bears against the exterior surface of head part 44 and cooperates with a projection 80 on the exterior surface of head part 44 to retain fastener 18 in place relative to receptacle 60. Projection 80 cooperates with flap 78 to prevent receptacle 60 from becoming disengaged from fastener 18 if, for example, sheet 50 experiences thermal expansion, or when, during installation of sheet 50, the other side of sheet 50 has not as yet been fastened in place.

To bring a receptacle 60 into engagement with fastener 18, sheet 50 must be stretched over the top of flange 24 and then top walls 72 of pocket 70 are moved around head 44 and into alignment with post 46. When the tension on the free end of sheet 50 is then released, pocket 70 is caused to move so that post 46 engages in recessed part 74 and fastener 18 is retained in place relative to receptacle 60.

Although projection 80 assists in retaining fastener 18 in position relative to receptacle 60, separation may be achieved easily by pulling outwardly on the free end of sheet 50 so as to cause flap 78 to ride over projection 80 and allow receptacle 60 to be removed from fastener 18. However, the fastening arrangement according to the present invention will successfully resist forces imposed on sheet 50 in virtually any other direction.

Since each fastener 18 can slide along its associated rail 4, 6 or 8, positioning of each fastener relative to its associated receptacle is a simple exercise.

Since all fasteners 18 are arranged to face outwardly of the opening to be covered and are inclined relative to the vertical, and sheet 50 is stretched over top flange 24, sheet 50 can be placed under tension and a neat connecting arrangement achieved, even if stays 16 are not provided.

Finally, to complete the illustration, a front view of two forms of construction of fastener 18 is shown in FIGS. 6 and 7. In the embodiment shown in FIG. 6, head part 44 of fastener 18 has a circular outline. A fastener having this form will prove satisfactory under most circumstances. However, particularly under cold weather conditions when parts 18 and 60 are made of materials such as vinyl, the thermal contractions experienced by part 60 could interfere to a certain extent with easy insertion of head part 44 of button 18 into pocket 70. This problem will be alleviated by giving the head part of the button the form shown at 44' in FIG. 7. According to this form of construction, the portion of head part 44' which will be the leading edge when head part 44' is to be introduced into pocket 70 is narrowed in order to compensate for the problems resulting from such thermal contraction.

Referring again to FIG. 2 it will be noted that lip 36 and projecting member 40 extend over two opposed edges of base part 42 of fastener 18 in order to retain fastener 18 in the channel.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a system for covering an opening in a structure, the opening having a periphery, the structure having sidewalls surrounding the opening and extending along the periphery of the opening, and the system including means defining a frame mountable on the sidewall so as to surround the opening, a flexible sheet for covering the opening, and connecting means for securing the sheet to the frame, the improvement wherein said connecting means comprise:

a plurality of button members retained by said frame so as to be movable in the direction of the periphery of the opening and to be inseparable from said frame, each button member having a button protruding from said frame;

a plurality of receptacle members each secured to the sheet and having a receptacle in the form of a pocket for securely but detachably retaining said button of a respective button member;

each said button member comprising a base part held in said frame;

said button of each said button member comprising an enlarged head part retainable in a respective receptacle, and a post supporting said head part on said base part;

each said receptacle member having an opening disposed adjacent said pocket and dimensioned to receive said post of the respective button member;

said frame having a channel for receiving said base parts of said button members in a manner such that said button members face outwardly from the opening;

said enlarged head part of each said button having an exterior surface which faces away from said base part; and each said receptacle member comprising an elastically deformable retaining element arranged to engage said exterior surface of said enlarged head part of a respective button when said head part is in said receptacle of said receptacle member.

2. A system as defined in claim 1 wherein each said button further has a projection which extends from said exterior surface and is disposed adjacent said retaining element of a receptacle member retaining said button.

3. A system as defined in claim 2 wherein each said receptacle member is of a plastic material and is mechanically fastened to the sheet.

4. A system as defined in claim 3 wherein said button members face upwardly and said frame includes a top flange located above, and spaced inwardly of, said button members when said frame is mounted on the sidewall so that the sheet rests on said top flange when said buttons are retained by said receptacle members.

5. A system as defined in claim 4 wherein said base member of each said button member has two opposed edges and said channel in said frame is formed to cover said base member edges in order to retain each said button member in said channel.

6. A system as defined in claim 3 wherein each said receptacle member has two opposed edges and is provided, at each of said edges, with a flat, elongated portion via which said receptacle is mechanically fastened to the sheet.

7. A system as defined in claim 3 wherein each said button member is of a plastic material.

8. A system as defined in claim 7 wherein each said receptacle member and each said button member is constituted by a one-piece molded part.

9. A system as defined in claim 1 wherein said head part and said post part of each said button have a circular form and said base part of said button is rectangular in shape.

10. A fastening system for securing a flexible sheet to a rail having a channel formed therein, the system comprising:
- a rail comprising a horizontal base piece, a top flange, a vertical web extending between the base piece and the flange, and an inclined web wherein the inclined web cooperates with the vertical web and base piece to form a triangular passage;
- said base piece having an end wherein the end is folded up to form a retaining lip;
- said top flange having a projecting member wherein said projecting member includes a free end which faces toward said inclined web;
- said inclined web, lip and projecting member cooperating to form a channel;
- a plurality of fasteners each including a base part, a button having an enlarged head part and a post supporting head part on said base part of each said fastener wherein said base part of each said fastener rests on said inclined web and is retained in said channel by said lip and said projecting member;
- a flexible sheet;
- a plurality of receptacle members each including upper and lower strips for connecting said sheet to each said receptable for distributing the stresses between the sheet and each receptacle;
- each said receptacle further including a body part in the form of a pocket for receiving and securing said head part of a fastener; and
- each said receptacle further including a resiliently deformable retaining element for engaging said head part of a respective fastener when said head part is inserted into said pocket.

11. The system according to claim 10 wherein said enlarged head parts of said fasteners each include an exterior surface having a projection which extends therefrom and is disposed to said retaining element of a receptacle member retaining said fastener.

12. The system according to claim 10 wherein each said receptacle is of a plastic material and is mechanically fastened to the sheet.

13. The system according to claim 10 wherein each said receptacle is of a plastic material.

14. The system according to claim 10 wherein said pocket of each said receptacle has an opening defined by two inclined walls and a recessed part having generally a U shape and dimensioned for receiving a post supporting head.

15. The system according to claim 11 wherein said projection cooperates with said deformable retaining element to prevent said receptacle from becoming disengaged from said fastener.

16. The system according to claim 10 wherein each said fastener can slide along said rail.

17. A system as defined in claim 10 wherein said head part and said post part of each said button have a circular form and said base part of said button is rectangular in shape.

* * * * *